United States Patent

Evans et al.

[15] 3,651,481

[45] Mar. 21, 1972

[54] READOUT SYSTEM FOR VISUALLY DISPLAYING STORED DATA

[72] Inventors: John T. Evans; Leroy U. C. Kelling, both of Waynesboro, Va.

[73] Assignee: General Electric Company

[22] Filed: Feb. 29, 1968

[21] Appl. No.: 709,429

[52] U.S. Cl. ........................................340/172.5, 340/324.1

[51] Int. Cl. ......................G06f 7/30, G06f 13/02, G06h 3/14

[58] Field of Search ....................................340/172.5, 324.1

[56] References Cited

UNITED STATES PATENTS

| | | | |
|---|---|---|---|
| 3,298,013 | 1/1967 | Koster | 340/324.1 |
| 3,400,377 | 9/1968 | Lee | 340/324.1 |
| 3,235,849 | 2/1966 | Klein | 340/172.5 |
| 3,278,904 | 10/1966 | Lekven | 340/172.5 |
| 3,307,156 | 2/1967 | Durr | 340/172.5 |
| 3,309,671 | 3/1967 | Lekven | 340/172.5 |
| 3,441,910 | 4/1969 | Kahn | 340/172.5 |
| 3,453,601 | 7/1969 | Bogert et al. | 340/172.5 |

*Primary Examiner*—Gareth D. Shaw
*Assistant Examiner*—Jan E. Rhoads
*Attorney*—William S. Wolfe, Frank L. Neuhauser, Oscar B. Waddell and Joseph B. Forman

[57] ABSTRACT

A system for visually displaying interlaced data stored in a recirculating delay line. The stored data is in six functions, each function comprising three eight digit words. Data within each function is interlaced by presenting the least significant digit of all three words, followed by the next to least significant digit of all three words and so on. The data display may be single selected words or may comprise display of particular words in predetermined sequence. Sequential display of all three words in selected functions is accomplished by providing a three bit recirculating shift register. The sequencing rate is controlled by a variable frequency oscillator. It is also possible to sequentially select the data associated with each letter address. This is accomplished by way of a second recirculating shift register whose sequencing rate is also controlled by the variable frequency oscillator. As the data is selected, it is fed into a third shift register where it is stored in binary coded decimal. A BCD to decimal converter converts the contents of the third shift register to decimal format. THe output of the BCD to decimal converter feeds the display device. The rate at which the contents of the third shift register are "updated" may also be controlled by providing an oscillator whose frequency determines the "update" rate.

5 Claims, 12 Drawing Figures

INVENTOR.
JOHN T. EVANS
LEROY U. C. KELLING
BY Michael Masnik
THEIR ATTORNEY

INVENTOR.
JOHN T. EVANS
LEROY U.C. KELLING
BY Michael Masnik
THEIR ATTORNEY

INVENTOR.
JOHN T. EVANS
LEROY U.C. KELLING
BY Michael Masnik
THEIR ATTORNEY

INVENTOR.
JOHN T. EVANS
LEROY U.C. KELLING
BY Michael Masnik
THEIR ATTORNEY

INVENTOR.
JOHN T. EVANS
LEROY U.C. KELLING
BY Michael Masnik
THEIR ATTORNEY

INVENTOR.
JOHN T. EVANS
LEROY U.C. KELLING
BY Michael Masnik
THEIR ATTORNEY

INVENTOR.
JOHN T. EVANS
LEROY U.C. KELLING
BY Michael Masnik
THEIR ATTORNEY

INVENTOR.
JOHN T. EVANS
LEROY U.C. KELLING
BY Michael Masnik
THEIR ATTORNEY

INVENTOR.
JOHN T. EVANS
LEROY U.C. KELLING
BY Michael Masnik
THEIR ATTORNEY

INVENTOR.
JOHN T. EVANS
LEROY U.C. KELLING
BY Michael Masnik
THEIR ATTORNEY

READOUT SYSTEM FOR VISUALLY DISPLAYING STORED DATA

BACKGROUND OF THE INVENTION

This invention relates to a system for displaying digital data in visual form. More particularly, the invention relates to a readout system for selecting and displaying data, part of which is serially stored in an interlaced format.

In digital data storing and processing systems, it is often desirable to be able to visually display stored data. This requirement may spring, for example, from the desire of the person operating the system to monitor system operation. Additionally, the capability to selectively display stored data is extremely valuable for maintenance purposes, so that system operation can be monitored without the need for additional test equipment such as oscilloscopes, etc.

Digital data processing systems are being widely applied, not only for the pure processing of data but also for performing data processing so as to control external devices, such as machine tools, chemical processes, etc. Such control systems are referred to as "process computer." In these applications, it is particularly important for the person operating the system to be able to monitor system operation so as to guard against ruining a valuable casting or improperly blending expensive chemicals.

It is an object of the present invention to provide a visual display system which is particularly adopted to allow supervision of critical data during operation of a process computer.

In one known type of process computer, the data is serially stored and processed in a recirculating loop. The data is stored in interlaced format so as to simplify the implementation of the requisite computations.

It is an additional object of the present invention to provide an improved signal processing arrangement.

It is an additional object of the present invention to selectively display data which is serially stored in an interlaced format.

In a copending application Ser. No. 709,242 filed Feb. 29, 1968 and assigned to the assignee of the present invention, there is disclosed a control system particularly adaptable to the control of machine tools. The data is stored and processed in serial interlaced format. The particular data format shown is specifically applicable to performing the requisite operations for machine tool control. In this type of system, certain known sequences of visual display are desirable.

It is a further object of the present invention to provide for the visual display of data in predetermined sequences.

SUMMARY OF THE INVENTION

These objects are achieved in a readout system for visually displaying stored digital data. The data is grouped by functions with each function group having a plurality of multidigit words. The words in each function group are interlaced by presenting the least significant digit of each of the words in coded group form followed by the next-to-the-least significant digit of each of the words in the same form. The grouping of digits is continued in this fashion until all of the words are interlaced. The readout system comprises a selection means by means of which the words to be displayed are selected, the sequence in which the words to be displayed is selected and the rate at which the words are to be displayed in the sequence is also established. The rate of display is made adjustable by means of a variable frequency oscillator. Storage means are connected to the output of the selection means for storing the selected words in a noninterlaced format. A visual display means is connected to the storage means for providing a visual display of the contents of the storage means.

DESCRIPTION OF THE PREFERRED EMBODIMENT

Figure 1:
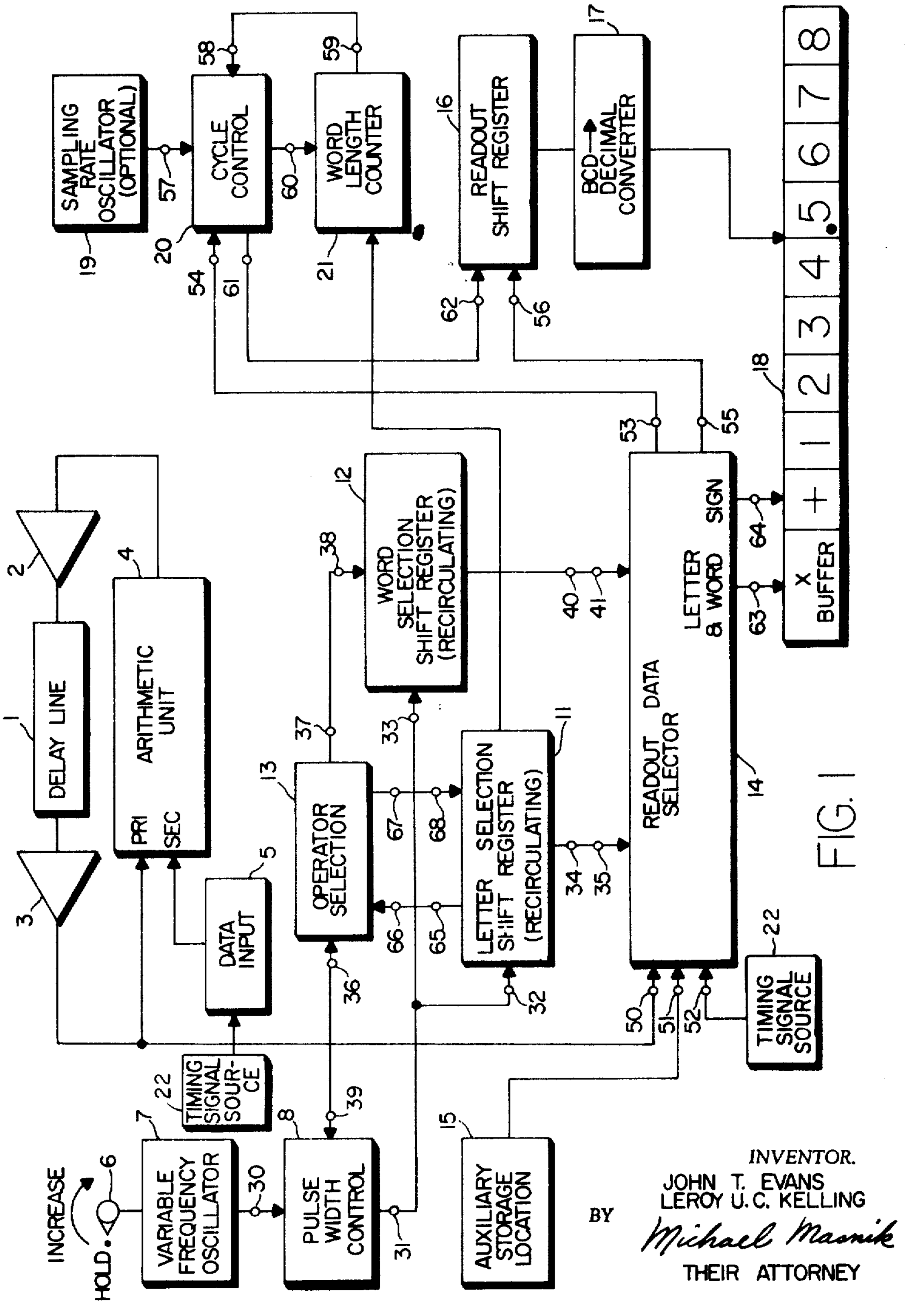
FIG. 1 is a block diagram of the readout and display system which forms the preferred embodiment of the present invention.

Turning now to FIG. 1, there is shown in block diagram form the system which utilizes the preferred embodiment of the present invention.

One source of the data to be displayed may be stored in recirculating storage means such as delay line 1, write amplifier 2, read amplifier 3 and arithmetic unit 4. Data is entered onto the delay line 1 by the write amplifier 2 and circulated out of read amplifier 3. The output of read amplifier 3 is connected to one input of arithmetic unit 4 whose output is then fed into the write amplifier 2. Hence, delay line 1, amplifiers 2 and 3, and arithmetic unit 4 form a recirculating storage loop for digital data. Data is entered into this recirculating storage loop by means of a suitable data input 5 which, in the present embodiment, is shown being fed into a secondary input of the arithmetic unit 4. It is, of course, obvious that the data could as well be input directly into the delay line or at any other point in the recirculating loop. The data input 5 may comprise, for example, a tape reader for reading magnetic or punched paper tape or may alternatively comprise a panel whereby the person operating the system can manually enter the desired data.

The data entered into the system from data input 5 is identified as a series of words, each of which is prefixed by a letter indicative of its desired location and function, followed by digital data. When the data is actually entered onto the recirculating loop by entry into arithmetic unit 4, the identifying letter is not entered into the loop, but rather the digital data alone is entered. While it is on the recirculating storage loop, the data is then identified not by the presence of an appropriate letter prefix, but rather is identified by its location in the recirculating loop. This location, as will be pointed out in more detail hereinafter, is determined in accordance with a series of timing signals which are synchronized with the circulation of data in the loop.

The system of the present invention has the capability of displaying a particular word stored in the loop and continually updating the value of that word so as to reflect changes during manipulations in arithmetic unit 4. Additionally, the system has the capability of presenting a selected number of words in a predetermined sequence. Finally, the rate at which this sequence takes place is also determined by the person operating the system. It should be pointed out, however, that while the preferred embodiment illustrates the display is controlled by the individual operating the system, it could just as easily be controlled by a predetermined programming sequence or alternatively by use of auxiliary instructions from any type data source.

The rate at which the sequential data display takes place is determined according to the setting of indicator 6. Indicator 6 may be set, for example, in the position labeled "Hold", in which case the particular word being displayed is held in the display, as opposed to continually sequencing through the data desired. As the indicator is moved in the clockwise direction, the rate at which the data sequence takes place is increased. Indicator 6 serves to control the frequency of a variable frequency oscillator 7 by, for example, varying the value of an adjustable potentiometer. Variable frequency oscillator 7 may be, for example, a simple unijunction relaxation oscillator whose frequency is adjustable between say 0.5 and 2 c.p.s. When the system is operating to display a series of words in predetermined sequence under control of 8, the sequence will take place in accordance with the output of variable frequency oscillator 7. Each time a pulse is outputted from variable frequency oscillator 7, a shift will occur in one or both of the letter and word selection shift registers 11 and 12 to select the next word in the sequence to be displayed.

Selection of the word to be next displayed is determined by the shift in registers 11 and 12 which is controlled by pulse width control 8. The input 30 of pulse width control 8 is connected to the output of variable frequency oscillator 7. Each time there is a pulse output from variable frequency oscillator 7, the pulse width control 8 will output a pulse whose width is indicative of the shift required in registers 11 and 12 in order to select the next word desired. This pulse which appears at output terminal 31 of pulse width control 8 is fed to input 32 of the letter selection shift register 11, and input 33 of the word selection shift register 12. For the scan mode being described, a SCAN LETTERS signal is also available from 13 over lines 67, 68 which will be described shortly. For the time being, if the output at terminal 31 is to be used by the shift register 11, it is sufficient to say that if the next letter to be displayed is letter five and the present letter being displayed is letter two, then the width of the pulse which is outputted from pulse width control 8 will be three clock times. Since there were three clock pulses fed into the letter selection shift register 11, this will advance the selected letter from letter 2 to letter 5 as will be seen in more detail hereinafter.

Reference may now be had to copending application Ser. No. 709,242 previously mentioned, assigned to the assignee of the present invention. In this copending application it is explained that the data associated with a particular letter, or address designating a particular function, may comprise three distinct words. In a first usage, the data is identified as buffer, command, and position data. In a second usage, the data is identified as buffer, integrand and remainder. For the sake of simplicity in this application the term "buffer word" will be used to denote the buffer data for both of these usages. The term "command word" will be used to generically denote the command word for the first usage and the integrand word for the second usage. Finally, the term "position word" will denote the position word in the first usage and the remainder word in the second usage.

As will be pointed out in more detail hereinafter, sequential display may comprise one of two possible sequences or both sequences in combination. The first sequence is the display of the buffer, command, or position word of every letter. The second sequence is the display of the buffer, command and position words associated with a designated letter. To accomplish the first sequence, it is necessary to select the particular word desired by means of operator selection 13. This sets up the desired word in the word selection shift register 12. Each time a pulse is fed via input terminal 32 from inverter 10 to letter selection shift register 11, the next desired letter will be selected. Since shift register 11 is a recirculating shift register, it will return to the first letter after the last letter in sequence is displayed.

To accomplish the second sequence, the letter desired is selected in operator selection 13. This sets the desired letter in shift register 11. During this type of operation, the pulses output at terminal 31 are fed via input terminal 33 into the word selection shift register 12. With each pulse the shift register 12 will advance through the sequence of buffer, command and position. Shift register 12 is also a recirculating shift register.

When both types of sequencing are called for the word selection shift register 12 will begin by being set to the buffer word. Each pulse at input terminal 32 will advance the letter selection shift register 11. After the last letter has been selected, the next pulse at output terminal 31 will advance both shift registers 11 and 12, thereby selecting the command word in shift register 12 and restarting the sequence in shift register 11. After all command words have been displayed, the word selection shift register 12 will advance to the position word and the letter selection shift register 11 will again resequence.

The output of letter selection shift register 11 is a plurality of lines each representing a specific letter. The line that is energized provides a logic state signal over the particular line to 14 for selecting the data and identifying the letter to be displayed by 18. For simplicity, this is shown as a single line which feeds data via terminal 34 to input terminal 35 of the readout data selector 14 for display. In addition, the output of the word selection shift register 12 is similarly fed via output terminal 40 to input terminal 41 of readout data selector 14. The purpose of readout data selector 14 is to select the data that is associated with the particular letter (selected by letter selection shift register 11) and the particular word of that letter (selected by word selection shift register 12). This data may come, for example, from the delay line 1 since the output of the read amplifier 3 feeds into readout data selector 14 via input terminal 50. Alternatively, the data may come from an auxiliary storage location 15, which feeds into readout data selector 14 via input terminal 51.

Auxiliary storage location 15 may be, for example, an additional recirculating data loop similar to that formed by delay line 1, amplifiers 2 and 3 and arithmetic unit 4. In addition, it might also comprise a shift register in which specific data is held in a noninterlaced fashion. The manner for selecting the data from 15 for display may comprise elements similar 11, 12 and 13 for selecting data from the circulating loop and which will be described in further detail hereafter.

In order to select the proper data, both at the proper time and from the appropriate location, a series of timing signals, which will be explained in more detail hereinafter, are fed into readout data selector 14 by means of input terminal 52.

When the data has been selected, it will be relayed by output terminal 55 of readout data selector 14 into the readout shift register 16 by input terminal 56. The purpose of readout shift register 16 is to store the data to be displayed. The output of readout shift 16 feeds into a binary coded decimal (BCD) to decimal converter 17, which converts the binary coded decimal data stored in the readout shift register 16 to decimal signals in any one of several well-known manners. These decimal signals are then fed into the readout device 18. Readout device 18 may be, for example, a series of display lights or mechanical indicators.

Since BCD to decimal converter 17 operates only on the numerical data stored, it is also necessary to provide signals which indicate which letter and associated word is being displayed and, in certain instances, whether the data is positive or negative. These signals are relayed from readout data selector 14. The letter and associated word being selected is fed by output terminal 63 of readout data selector 14 and the appropriate sign, if any, is fed out via the output terminal 64.

In the operation outlined above, each time the data was circulated through the recirculating storage medium it was presented to the input 56 of readout shift register 14 and consequently the data being displayed could be "updated" on each circulation. The nature of the data storage and the readout device makes it desirable or permissive to update the information in readout shift register 16 at some rate other than every circulation time. This rate is selected by providing a sampling rate oscillator 19. The output of sampling rate oscillator 19 may be, for example, 50 Hz. such that the contents of the display device 18 is "updated" 50 times every second.

The output of sampling rate oscillator 19 is fed into a cycle control 20, via input terminal 57. A second input to cycle control 20 comes from readout data selector 14 via output terminal 53, which is connected to input terminal 54 of cycle control 20. The purpose of cycle control 20 is to assure that the readout shift register 16 is activated at the proper times in accordance with the output of sampling rate oscillator 19 and the readout data selector 14. The output of cycle control 20 is fed via input terminal 60 into a word length counter 21, which acts to assure that words of different length are appropriately inserted in the proper position in readout shift register 16. When the desired number has been reached in word length counter 20, a signal is fed from output terminal 59 to input terminal 58 of cycle control 20, which cuts off the output of cycle control 20, which is relayed via output terminal 61 to input terminal 62 of the readout shift register 16.

Summarizing the operation of the system shown in FIG. 1, it is important to note that the system is capable of repeatedly displaying a single selected letter and one of its associated words. When this type of operation is desired, the single letter and word are selected via operator selection 13.

When a predetermined sequence is desired, the person operating the system selects the desired sequence via operator selection 13. The rate at which this sequence will be displayed is determined by the output frequency of variable frequency oscillater 7, which can be adjusted by the operator according to the setting of the indicator 6. Hence, the indicator 6 is used to vary the rate at which the sequence of display takes place. In addition, the data during the display of each word will be continuously updated, either each time the data circulates through a circulating storage medium, or alternatively at a predetermined rate set by sampling rate oscillator 19. Finally, the person operating the system may interrupt sequencing at any point by setting indicator 6 to the "Hold" position.

Figure 2:
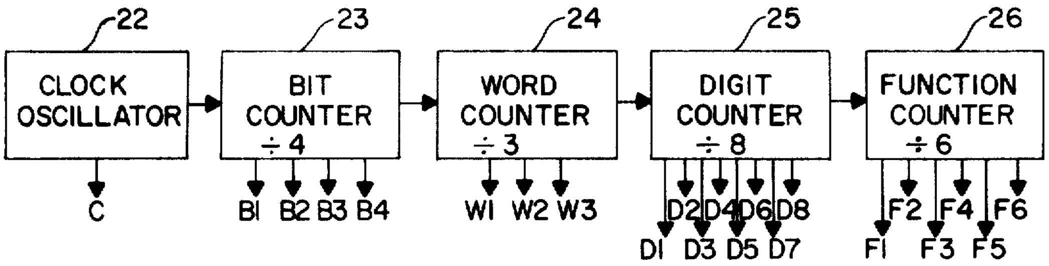
FIG. 2 is a block diagram of the clock oscillator and associated counters for generating the timing and synchronizing signals for the operation of the present invention.

Turning now to FIG. 2, there is shown the timing signal source or clock oscillator 22 and a series of counters 23, 24, 25, 26, which control and synchronize the operation of the readout system of the present invention. The output of the clock oscillator 22 is fed into a first divide by four circuit 23, denoted the bit counter, which outputs signals indicative of the four binary bits of the input data which is in binary coded decimal form. The output of the bit counter 23 is fed into a word counter 24 which divides the output of the bit counter 23 into three parts, to designate the three words of the interlaced format. Similarly, the output of the word counter 24 is fed into a digit counter 25 which further divides the frequency into eight parts indicative of the eight digits of the interlaced data. Finally, the output of the digit counter 26 is indicative of the six functions.

By way of illustration, the data is shown interlaced in such a fashion that there are six functions, eight digits, three words, four binary bits. It should be pointed out at this point that the system of the subject invention is not limited to the use of the specific number of functions, digits, words or bits, but rather may utilize any number of functions, digits words or bits and still fall within the scope of the present invention.

Before turning specifically to the operation of the clock oscillator 22 and its associated counters 23, 24, 25, 26 it is pertinent to define certain terms.

"Bit" alludes to the binary bits of the data utilized by the present invention. In the preferred embodiment of the present invention, the data is expressed in binary coded decimal, so that each digit is expressed by four binary bits arranged in ascending order. It should be pointed out, however, that the invention is not limited to the use of data in binary coded decimal form.

"Digit" refers to a conventional decimal digit, expressed in coded group form. In the present invention, the digits are expressed in the four bits of the binary coded decimal format.

"Word" refers to a group of digits which pertains to a particular address or operation.

"Function" is used to denote a group of words identified with the same letter. In the system of the present invention, there are six functions. Each function contains three words, each word having eight digits of four binary bits each.

Figure 3:
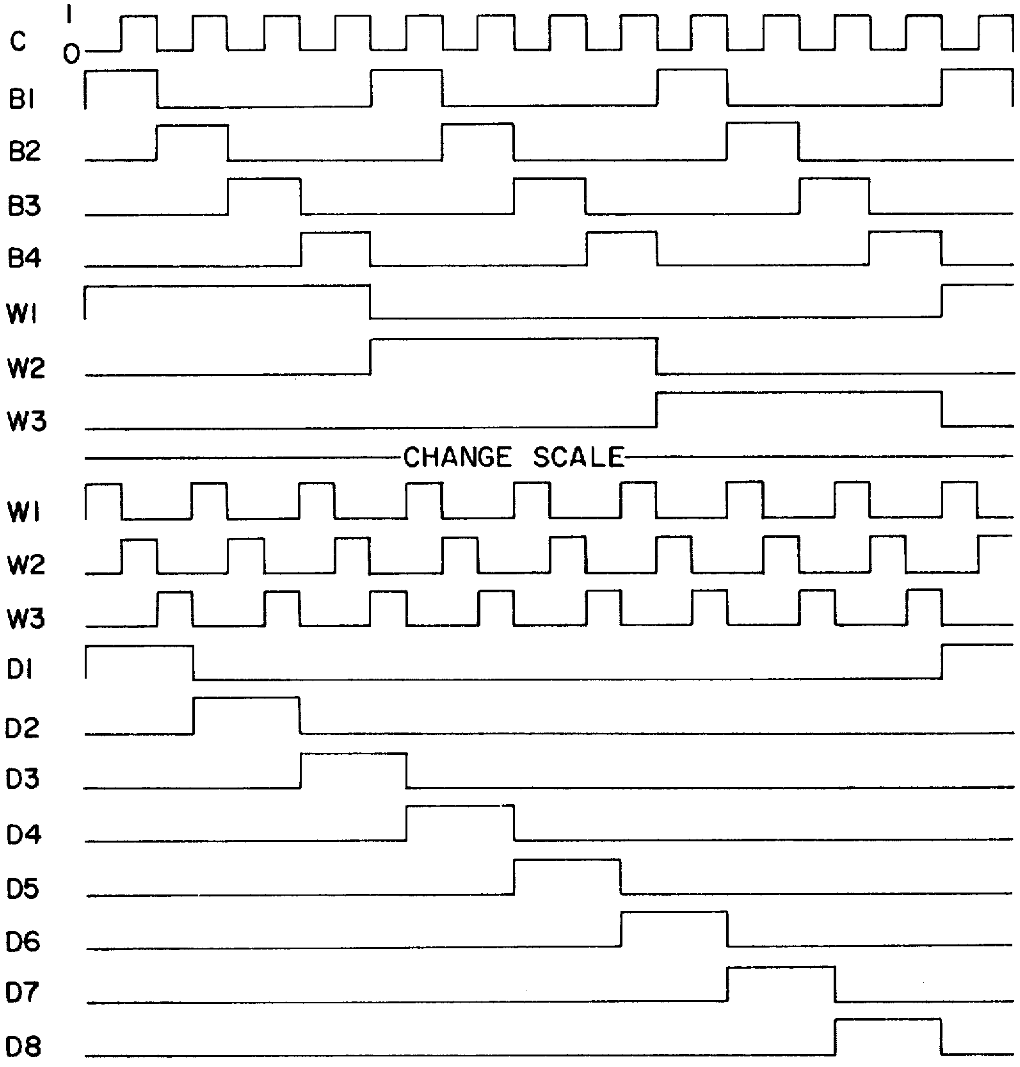
FIG. 3 is a series of waveforms illustrating the operation of the clock oscillator and counters shown in FIG. 2.
Figure 3A:
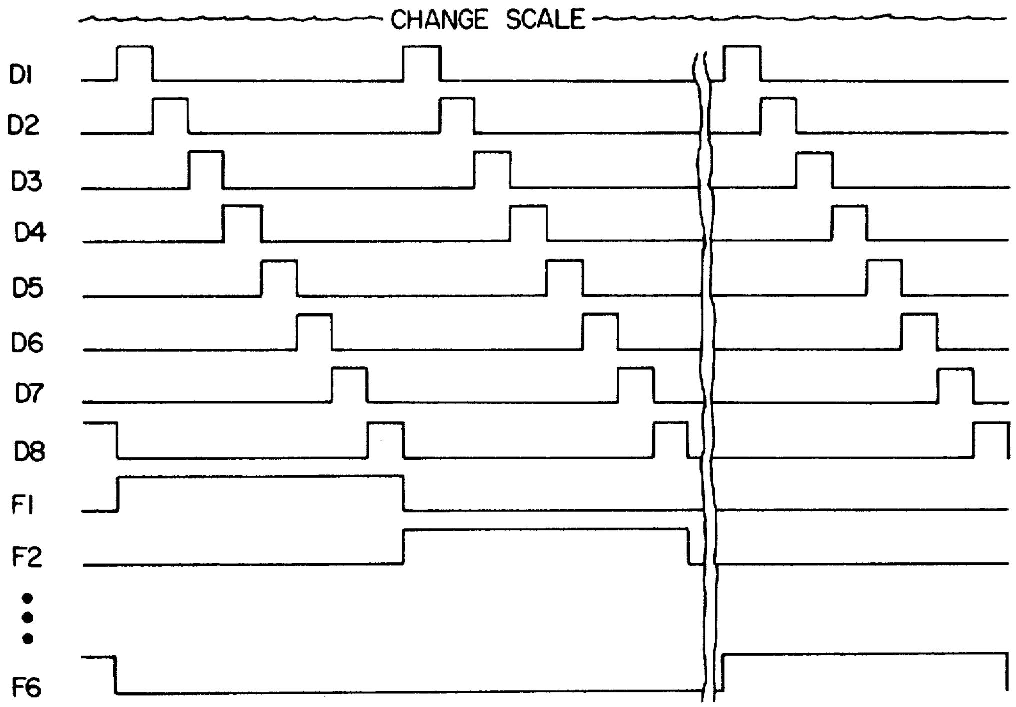
FIG. 3(a) is a series of waveforms further illustrating the operation of the counters shown in FIG. 2.

Turning now to FIG. 3, there is shown the major timing and control signals generated by the clock oscillator 22 and counters 23, 24, 25, 26. The output of the clock oscillator 22 is designated by the waveform C and is shown going from the lower voltage level to a higher voltage level in a square wave pattern. Since the control system is in digital form, the lower voltage level is designated as a logic "zero." The higher voltage level is designated as the logic "1" level. This notation is consistent throughout the operation of the system of the present invention. The waveforms *B*1, *B*2, *B*3 and *B*4 denote the timing signals indicative of the four binary bits. Similarly, the waveforms *W*1, *W*2 and *W*3 indicate the three words.

At this point in FIG. 3, there is a change in the time scale of the drawing and the signals *W*1, *W*2 and *W*3 are redrawn. Signals *W*1, *W*2 and *W*3 are divided by counter 25 to form the digit signals *D*1,*D*2, ..., *D*8 to represent the eight digits of the particular format used by the present embodiment of the invention.

Finally, the scale of the drawing is again altered and the signals *D*1 through *D*8 are presented. The signals *F*1, *F*2, *F*3 through *F*6 illustrate the timing of the six functions utilized by the present invention.

The purpose of the waveforms in FIG. 3 is to synchronize the interlacing of the data according to a particular format, which has been found to be particularly useful for accomplishing the requisite computations in a numerical control system. The data is interlaced such that the six functions are divided into three words each. Within each function, the data representing the three words is interlaced such that the least significant digits of all three words, represented in binary coded decimal, are first presented followed by the next digits of each of the three words, and so on until all eight digits of all three words in binary coded decimal form have been interlaced.

Figure 4:
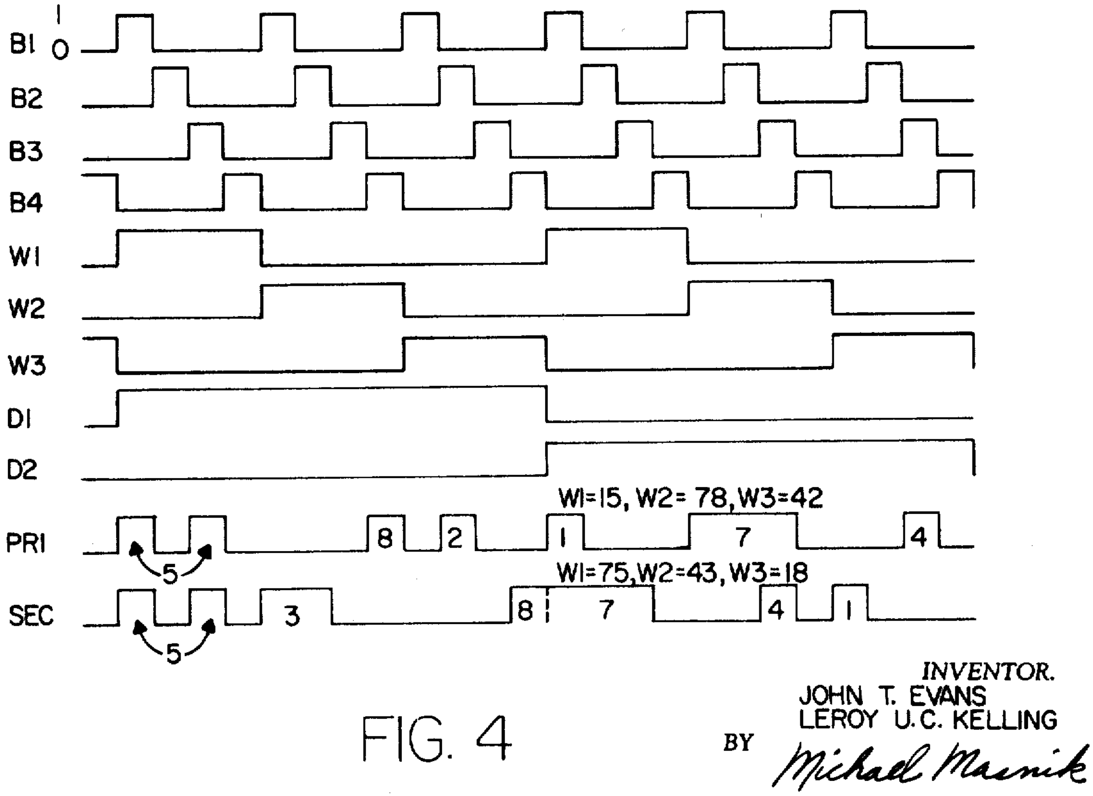
FIG. 4 is a series of waveforms illustrating the interlacing of data in accordance with the recirculating storage system whose data is to be displayed by the present invention.

Turning now to FIG. 4, there is shown an example of interlaced data which may be displayed by the system of the present invention. The top of FIG. 4 shows the waveforms *B*1–*B*4, *W*1–*W*3, and *D*1–*D*2, which corresponds to their similar waveforms in FIG. 3. Suppose that instead of eight digit words, for the purposes of this example, it is desired to interlace three, two digit words such that *W*1 = 15, *W*2 = 78 and *W*3 = 42. This interlaced data is illustrated by the waveform labeled "PRI". Before examining this interlaced data in detail, it is pertinent to adopt a convention for designating the time at which a particular bit appears. A binary bit appearing at bit 1, word 1, digit 1 time will be said to appear at *B*1*W*1*D*1 time. Similarly, a binary bit appearing at bit 4, word 2, digit 2 time will be said to be present at *B*4*W*2*D*2 time.

Turning now to the interlacing of the three words as shown by the signal labeled "PRI", it is noted that the first word is 15, the least significant digit is 5 and, hence, the signal "PRI" goes to logic 1 level at *B*1*W*1*D*1 time and at *B*3*W*1*D*1 time, thereby representing the digit 5 in binary coded decimal. Similarly, during word 2 time, the least significant digit is 8 and, accordingly, signal "PRI" goes to logic 1 at *B*4*W*2*D*1 time. Finally, since the least significant digit of word 3 is a 2, the signal "PRI" goes to logic 1 at *B*2*W*3*D*1 time.

Having interlaced the least significant digits of all three words, it is now necessary to interlace the next-to-least significant digits, beginning again at word 1. Accordingly, since the first digit of word 1 is a 1, the signal "PRI" goes to logic 1 at *B*1*W*1*a*02 time. Similarly, since the most significant digit of *W*2 is a 7, the signal "PRI" goes to logic 1 at *B*1*W*2*D*2, *B*2*W*2*D*2 and *B*3*W*2*D*2 times thereby representing the digit 7 in binary coded decimal form (0111). Finally, the most significant digit of word 3 is 4. This is indicated by the presence of a logic 1 in the signal "PRI" at *B*3*W*3*D*2 time.

The signal labeled SEC illustrates a similar interlacing of three other two digit words, namely *W*1 =75, *W*2 =43 and *W*3 =18.

DESCRIPTION OF THE LOGIC ELEMENTS

Before turning to a detailed discussion of FIGS. 5–11 which show the logic diagrams of the particular components of the invention, it will be necessary to describe briefly the NAND logic elements which are used to make up these particular components. It should be pointed out, however, that while the invention is illustrated by NAND logic elements, any type of logic, either negative or positive, could be utilized without departing from the spirit of the invention.

While it is true that only the one type of gate, i.e., a NAND gate is used, these gates are denoted in two forms in the logic diagrams, according to the desired operation of the gate. As is well known, a multi-input NAND gate will have a logic 0 at its output terminal if and only if all of its inputs are a logic 1 level. Accordingly, any time any of its inputs are at logic 0 level, the output will be at logic 1 level.

Figure 7:
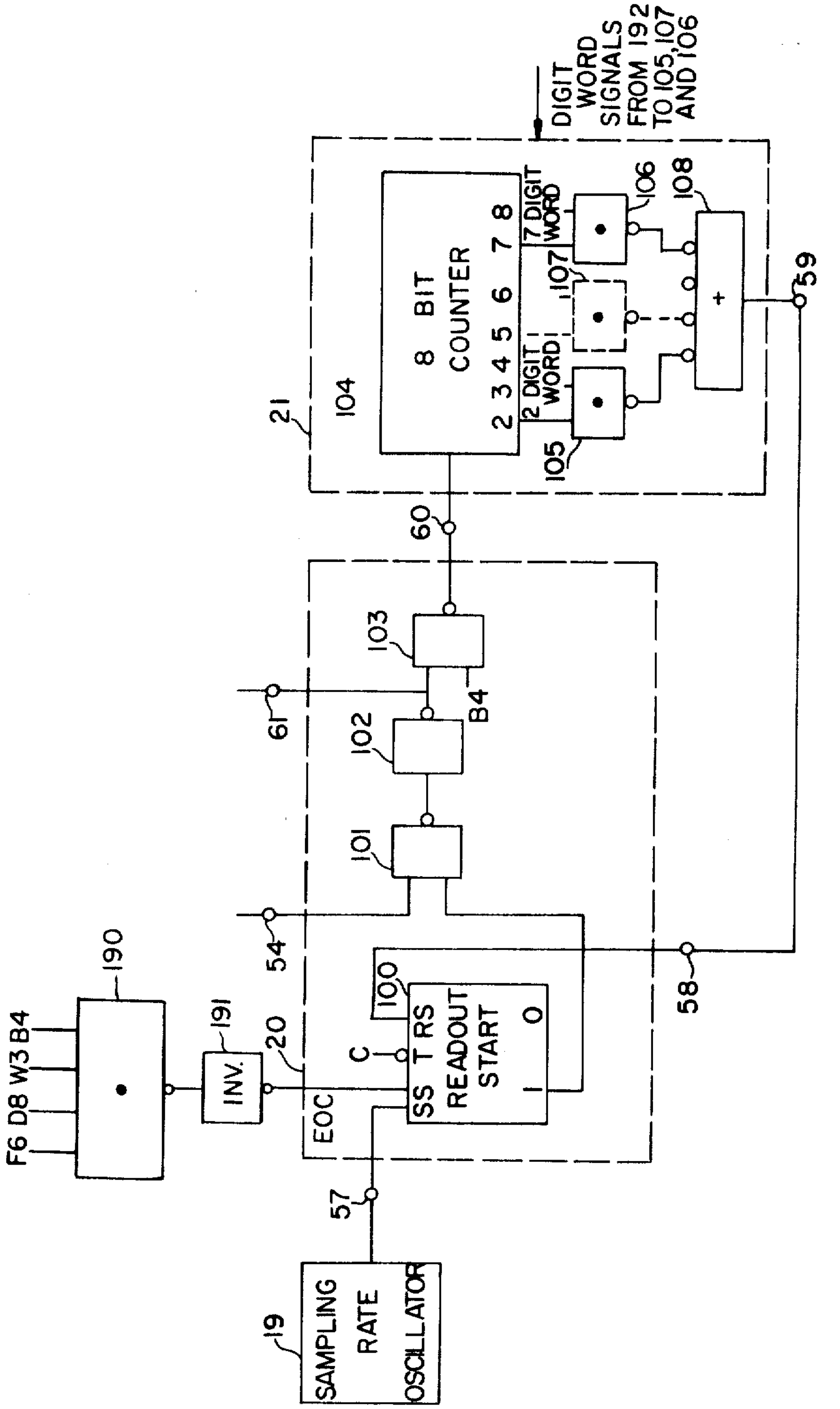
FIG. 7 is the detailed logic diagram of the sampling rate oscillator, cycle control, and word length counter shown in FIG. 1.

In FIG. 7, there is shown a two input NAND gate 101 whose inputs do not have circles and whose output does have a circle. In the middle of the gate is a dot indicating that the desired mode of operation of this particular NAND gate is as an "AND" gate. Accordingly, the desired operating condition for this gate is when there is a logic "1" at both of its inputs, the output will be a logic 0.

Figure 5:
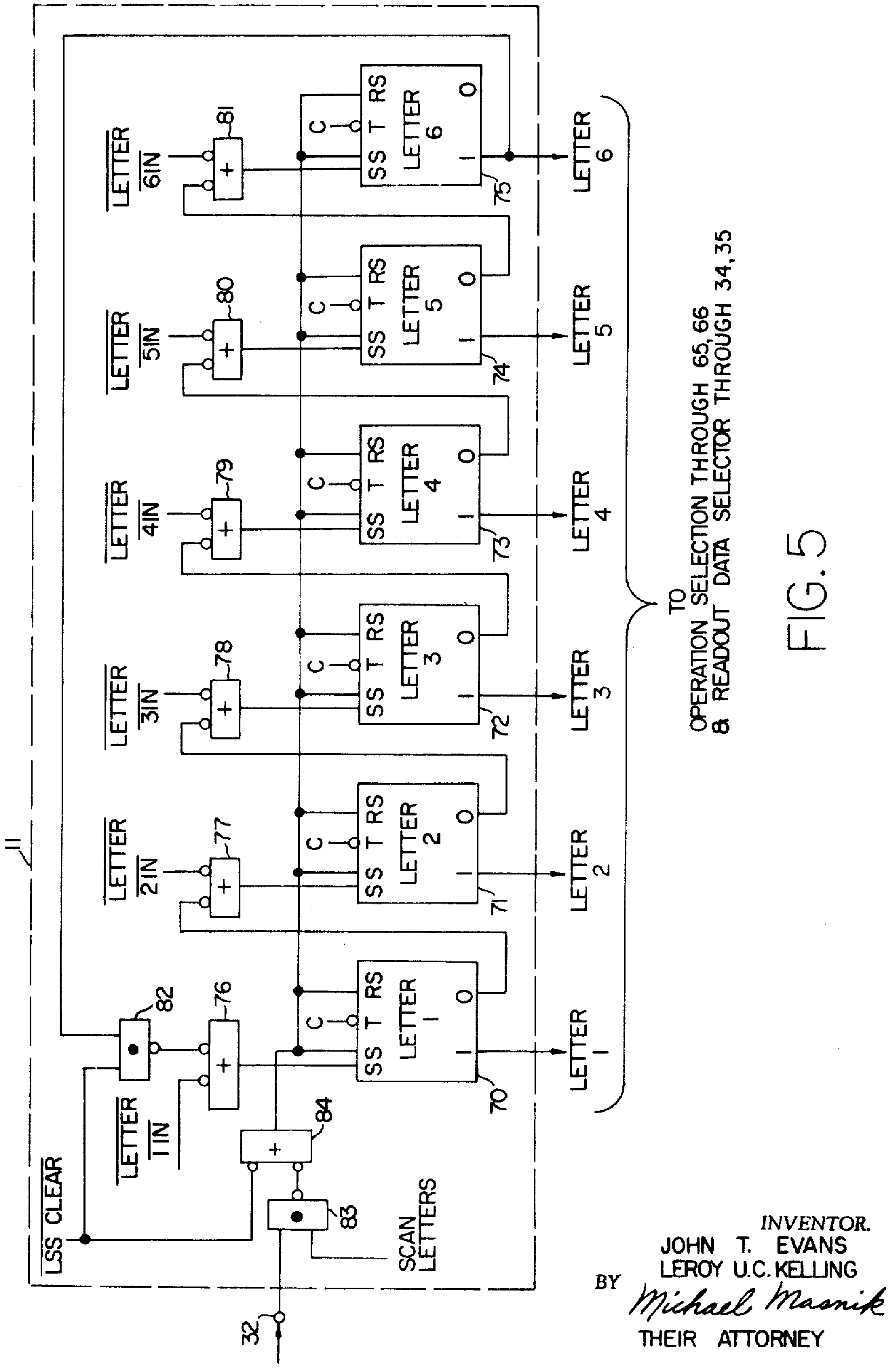
FIG. 5 is the detailed logic diagram of the letter selection shift register shown in FIG. 1.

On the other hand, NAND gate 76 in FIG. 5 is shown with circles at both of its inputs and no circle on its output. In addition, there is a plus sign in the middle indicating that the desired operation of this gate is as an "OR" gate such that the presence of logic "0" at either of its inputs results in a logic "1" at its output.

While the above description has pertained particularly to two input gates, it should be pointed out that the number of inputs is immaterial, since all inputs of a NAND gate, regardless of number, must be at logic "1" before the output of the multiple input gate is at logic "0.38

The logic element denoted 82 in FIG. 5 is a simple inverter whose operation is such that a logic "1" at its input (denoted without a circle) results in a logic "0" at its output (denoted by the circle). Conversely, the presence of a logic "0" at its input results in a logic "1" at its output.

In FIG. 5, the logic element denoted "letter 1" is a standard J–K flip-flop 70. As is well known, a J–K flip-flop conventionally has several input terminals for set steering (denoted SS), all of which must be at logic "1" to steer the flip-flop to set. An input terminal for reset steering (denoted RS), must be at logic "1" to steer the flip-flop to reset. The trigger terminal (denoted T) requires, as indicated by the circle at that input, a signal going to logic "0" to trigger the flip-flop. If both set and reset steering requirements are met simultaneously, the next trigger signal will cause the flip-flop to change state, i.e., set if it was previously reset and reset if it was previously set. The two outputs shown labeled 1 and 0 reflect the logic signal present during the set state. When the flip-flop resets, these signals assume the opposite state, i.e., output 0 goes to logic "1" and output 1 goes to logic "0".

In order to cause the flip-flop to set, the set steering inputs must be at logic "1" prior to the arrival of a logic "0" at the trigger. Hence, if the set steering inputs SS go to logic "1" simultaneously with the arrival of a logic "0" at the trigger T, the flip-flop will not set. On the other hand, if the steering terminals go to logic "1" prior to the arrival of a logic "0" at the trigger T but one or more of the steering inputs change to logic "0" at the same time the trigger goes to logic "0", the flip-flop will set.

Turning now to FIG. 5, there is shown the detailed logic diagram of the letter selection shift register 11. The recirculating shift register comprises a plurality of flip-flops 70–75, each of which is associated with a particular letter. It should be pointed out, however, that the number of flip-flops depends upon the particular system.

Input terminal 32 is connected to one input of gate 83. The other input to gate 83 is connected to the signal "SCAN LETERS" available over 67, 68. This signal is generated in operator selection 13 and and is a logic "1" when letter scan operation is selected. The output of gate 83 is connected to one input of gate 84. The second input of gate 84 is connected to the signal LSS CLEAR, the letter selector shift register clear signal. This signal is generated in operator selector 13 and is a logic "0" when the shift register is cleared upon the selection of a particular letter or upon the initiation of the letter scan cycle.

At the beginning of each letter scan cycle, the signal LETTER 1 IN and the signal LSS CLEAR will both be at logic 0 and accordingly flip-flop 70 will set. This is accomplished because the signal LETTER 1 IN is connected to one input of gate 76 which forms one of the set steering inputs on flip-flop 70 and the other set steering input is connected to the output of gate 84. Accordingly, until the next pulse is received at input terminal 32, the letter 1 flip-flop 70 will be set and accordingly, letter 1 will be be displayed. At the next pulse on input terminal 32, it is noted that the "0" output of the letter 1 flip-flop forms one input to gate 77. The output of gate 77 forms one of the set steering inputs to the letter 2 flip-flop 71. Accordingly, at the next pulse at input terminal 32, the set steering requirements to letter 2 will be satisfied so that it will, in fact, set at the next clock time thereafter. Hence, letter 2 is now selected.

From the foregoing, it can be seen that, at each subsequent pulse on input terminal 32, the successive letters in shift register 11 will be selected. Gate 78 operates to steer flip-flop 72 when flip-flop 71 is set. Similarly, gates 79, 80 and 81 steer their associated flip-flops 73, 74 and 75. Finally, in order to make the shift register 11 recirculate, the 1 output of flip-flop 75 is connected to one input of gate 82. The second input to gate 82 will be at logic "1" by virtue of the fact that LSS CLEAR is normally at logic "1". The output of gate 82 forms a second input to gate 76 so that flip-flop 70 will set at the next advance after flip-flop 75.

Once a flip-flop has set, it will be reset at the next pulse received on input terminal 32, since the reset steering terminals of flip-flops 70–75 are tied to the output of gate 84.

In the scan operation, detailed above, flip-flop 70 was initially set. However, it is possible to set any one of the flip-flops 70 through 75. If, for example, it is desired to set flip-flop 71 it is only necessary that both the signal LETTER 2 IN and the signal LSS CLEAR be at logic 0 simultaneously. All of the signals LETTER 1 IN through LETTER 6 in originate in operator selection 13. In addition, it is seen that the outputs of flip-flops 70–75 are indicated as being connected to operator selection 13 and the readout data selector 14. These connections insure that the appropriate letter has been selected and that the desired data will be selected via readout data selector 14.

Figure 6:
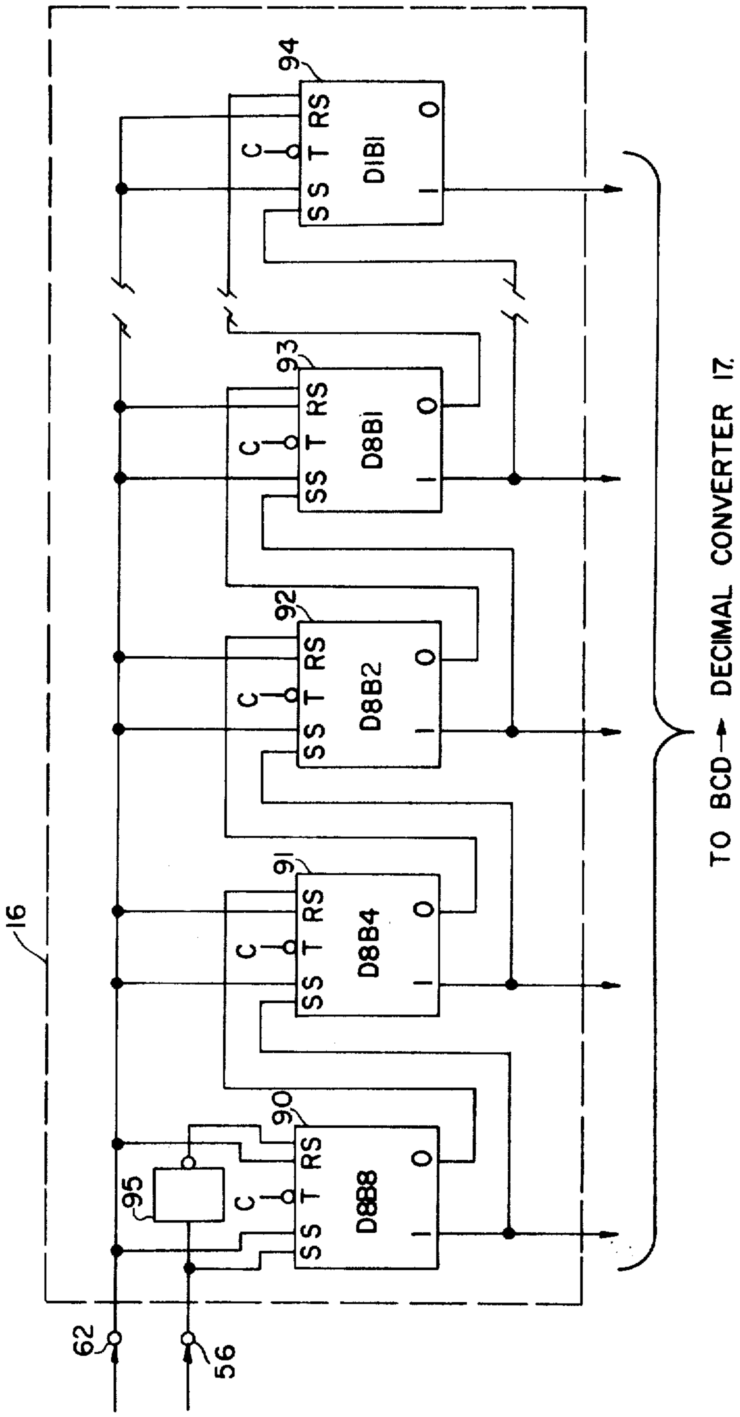
FIG. 6 is the detailed logic diagram of the readout shift register shown in FIG. 1.

Turning now to FIG. 6, there is shown the detailed logic diagram of the readout shift register 16. As was pointed out in the description of FIG. 1, the data to be displayed is presented at input terminal 56. Input terminal 62 is connected to the output of the word length counter 21 and operates to allow the data presented at input terminal 56 to shift into shift register 16. Shift register 16 is formed of a plurality of flip-flops, designated 90–94. In the preferred embodiment, there is a maximum of eight digits to each word. Since the words are in a four bit code, i.e., binary coded decimal, this requires a total of 32 flip-flops in shift register 16. FIG. 6 illustrates only five of these flip-flops and it is pointed out that the invention is not necessarily limited to the use of the specific number of flip-flops shown, but may be modified in any fashion in accordance with the data desired to be displayed without departing from the spirit of the invention.

So long as the input signal at terminal 62 is a logic "1", the data presented serially at input terminal 56 will successively shift into the shift register 16. This is accomplished by virtue of the fact that if the input signal at terminal 56 is a logic "1" then flip-flop 90 will set. Conversely, if the input signal at terminal 56 is a logic 0, it is noted that this terminal is connected to the input of inverter 95 whose output is connected to one of the reset steering terminals of flip-flop 90 and accordingly, if the input signal is a logic "0", flip-flop 90 will reset. Since the 1 output of flip-flop 90 is connected to a set steering terminal of flip-flop 91 and since the 0 terminal of flip-flop 90 is connected to one of the reset steering terminals of flip-flop 91, it is obvious that at the next clock time, the contents of flip-flop 90 will be shifted into flip-flop 91. Accordingly, all data which is presented at input terminal 56 will first be shifted into flip-flop 90 and then successively shifted through the shift register 16.

For example, if the data being displayed is an eight digit word, the signal at terminal 62 will stay at logic "1" level for 32 bit times so that the first data presented at input terminal 56 will eventually be shifted into the very last flip-flop 94 of the shift register. Conversely, if the data to be visually displayed is only a one digit word, then the signal at input terminal 62 will stay at logic "1" level for only four bit times so that the first bit of data presented at input terminal 56 will only be shifted to the fourth flip-flop 93 of the shift register.

Turning now to FIG. 7, there is shown the detailed logic diagram of the sampling rate oscillator 19, the cycle control 20, and the word length counter 21. As was pointed out above, the output of sampling rate oscillator 19 is fed into input terminal 57 of the cycle control 20. Flip-flop 100 has one of its set steering terminals connected to input terminal 57. The other set steering terminal is connected to a signal denoted EOC derived from the "ANDing" of the timing signals *F*6, *D*8, *W*3 and *B*4 by 190 and inverting in 191. The signal EOC indicates that the data circulating through the recirculating storage loop is at the end of its circulation and that a new circulation will begin at the next clock time. Accordingly, flip-flop 100 will set at the beginning of the next circulation after receipt of a pulse from the sampling rate oscillator 19. The 1 output of flip-flop 100 is connected to one input of gate 101. The other input gate 101 is connected to input terminal 54. As was pointed out above, input terminal 54 receives a signal from the readout data selector 14 which indicates that data is presently being presented at the input of readout shift register 16. When both inputs to gate 101 go to logic "1" the output of gate 101 goes to logic "0". The output of gate 101 is connected to the input of inverter 102 whose output will then be a logic "1". The output of gate 102 is connected to form one input to gate 103. The other input to gate 103 is the timing signal B4. Accordingly, the output of gate 103 will go to a logic "0" each time a digit of selected data is presented at the input of readout shift register 16. The output of gate 103 is connected to input terminal 60 of the word length counter 21.

Terminal 60 forms the count input to an eight bit counter 104. Accordingly, the contents of eight bit counter 104 will indicate the number of digits which have been circulated into the readout shift register 16. The purpose of eight bit counter 104 is to stop the circulation of data into readout shift register 16 as a function of the number of digits of the particular word being displayed. Accordingly, gate 105 has one of its inputs connected to the "2" output of the eight bit counter. The other input to gate 105 is connected to a signal labeled "Two Digit Word" which is supplied over connection 192 from letter selection shift register 11. Whenever the word being displayed is a two digit word, this signal available from 11 will be a logic "1" so that when the eight bit counter 104 counts two digits its "2" output will go to logic "1" and the output of gate 105 will go to a logic "0". The output of gate 105 forms one input to a multiple input gate 108. When the output of 105 goes to a logic 0, the output of gate 108 will go to a logic "1". The output of gate 108 is connected to output terminal 59 which is, in turn, connected to input terminal 58 of the cycle control 20. Terminal 58 is connected to the reset steering terminal of flip-flop 100 so that at the next clock time flip-flop 100 will reset. Resetting flip-flop 100 causes the 1 output of that flip-flop to go to logic "0". This output, which is connected to form one input to gate 101, causes the output of gate 101 to go to logic "1" and the output of inverter 102 to go to logic "0". The output of inverter 102 is connected to output terminal 61. This output terminal, as was pointed out above, is connected to the readout shift register 16 and when the signal at output terminal 61 goes to logic "0", the readout shift register 16 will no longer operate to receive data.

If, for example, the word being displayed is a seven digit word, the signal "SEVEN DIGIT WORD" available over connection 192 from register 11, which forms one input to gate 106, is a logic "1". The other input to gate 106 is the "7" output of the counter 104. Hence, when seven digits have been counted, the output of gate 106 will go to logic "0" and cause flip-flop 100 to reset as described above for a two digit word.

The number of digits varies for particular words and in order to appropriately control the shifting in readout shift register 16, it is only necessary to connect a plurality of gates under control of signals from 11 to the remaining outputs of eight bit counter 104. These plurality of gates for control of digits of other lengths are indicated symbolically by the gate shown as 107 connected to connection 192.

Figure 8:
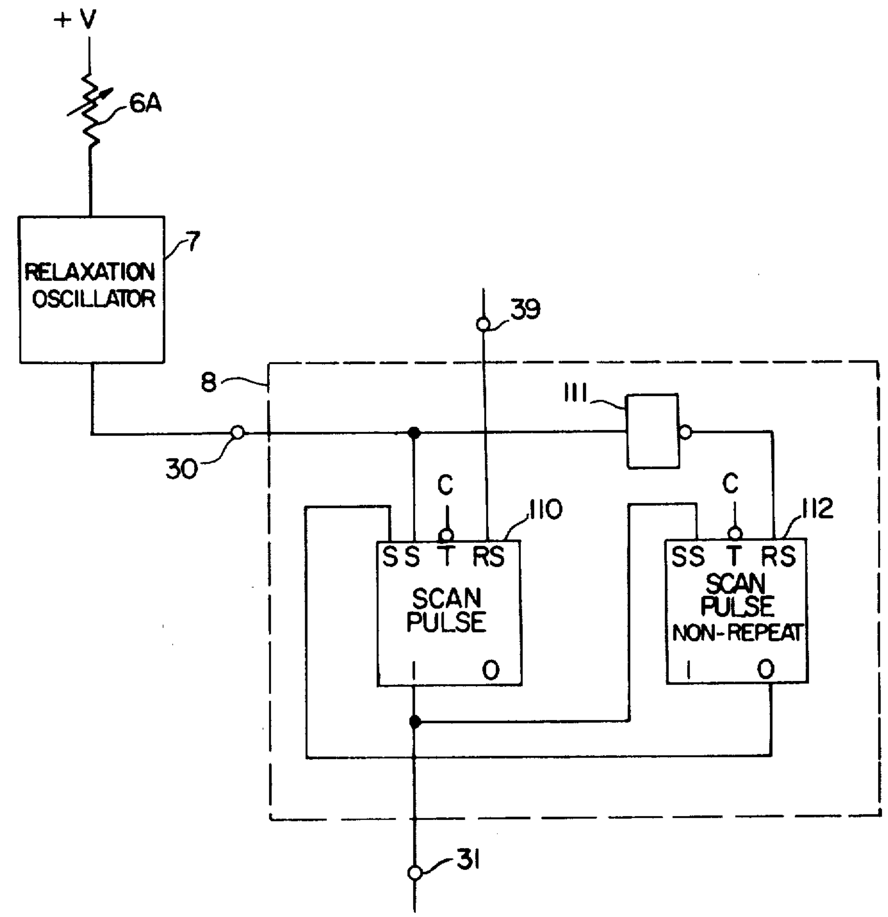
FIG. 8 is the detailed logic diagram of the variable frequency oscillator and pulse width control shown in FIG. 1.

Turning now to FIG. 8, there is shown the logic diagram of the pulse width control 8 in conjunction with the relaxation oscillator 7. Variable resistor 6A is shown connected to some positive voltage, +V. As it was pointed out above, the purpose of indicator 6 in FIG. 1 was to set the frequency of relaxation oscillator 7. As was also suggested above, indicator 6 may be attached, for example, to an adjustable resistor such as 6A. The variable frequency oscillator 7 has an output frequency which is, as pointed out above, a function of the setting of the indicator 6. This low frequency output is fed into input terminal 30 of the pulse width control 8. Each time a pulse is generated by the relaxation oscillator 7, its output goes to logic "1". Since terminal 30 is connected to one of the set steering inputs of flip-flop 110, flip-flop 110 will be steered to set if flip-flop 112 is reset. Accordingly, at the first pulse from relaxation oscillator 7, flip-flop 110 will be steered to set and will be set at the next clock time, C. After flip-flop 110 sets, flip-flop 112 will be steered to set by virtue of the fact that the 1 output of flip-flop 110 is connected to the set steering terminal of flip-flop 112. It is also noted that input terminal 39 is connected to the reset steering input of flip-flop 110. If the output of flip-flop 110 is to be a single clock time, the input to terminal 39 will be a logic "1" so that at the next clock time, flip-flop 110 will reset. In any event, at this next clock time, flip-flop 112 will set. Setting flip-flop 112 causes its 0 output to go to logic "0" level. This output is connected to one of the set steering terminals of flip-flop 110. So long as flip-flop 112 is set, flip-flop 110 cannot set.

When the output of the relaxation oscillator 7 goes back to logic "0", flip-flop 112 will be steered to reset by virtue of the fact that inverter 111 is connected between input terminal 30 and the reset steering terminal of flip-flop 112. Accordingly, at the next clock time, flip-flop 112 will reset and flip-flop 110 will be prepared to set the next time the output of the relaxation oscillator 7 goes to logic "1".

The 1 output of flip-flop 110 is connected to output terminal 31.

If it were desired to relay a signal longer than one clock time to shift registers 11 and 12, it is only necessary to hold flip-flop 110 set for more than one clock time. This is accomplished by changing the input on input terminal 39 to a logic "0" for the requisite time. This operation is described in detail in the description of operator selection 13.

Figure 9:
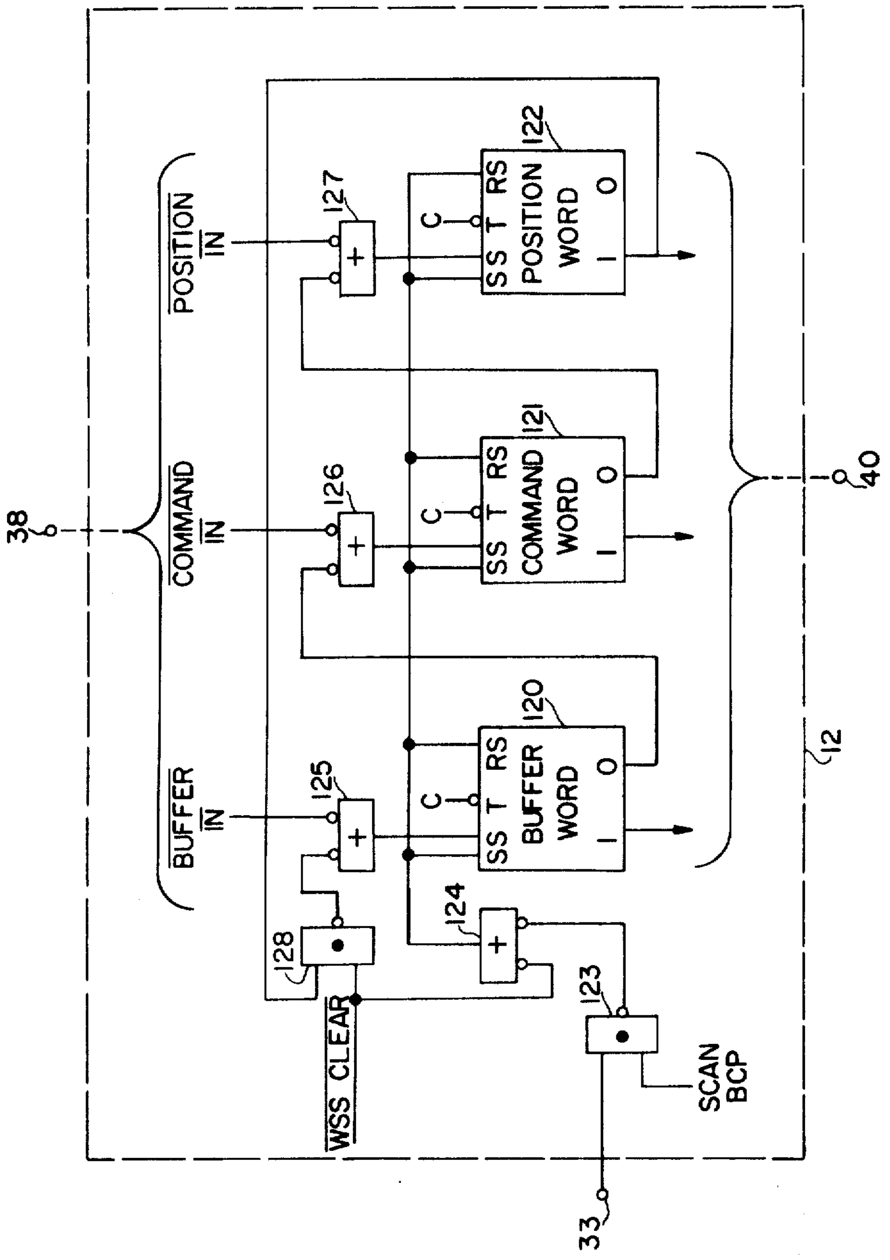
FIG. 9 is the detailed logic diagram of the word selection shift register shown in FIG. 1.

Turning now to FIG. 9, there is shown the detailed logic diagram of the word selection shift register 12. Word selection shift register 12 comprises three flip-flops 120, 121, 122 used to select, respectively, the buffer word, command word and position word. As was pointed out above, input terminal 33 relays the shift signal into this register. Accordingly, input terminal 33 forms one input to gate 123. The other input to gate 123 is the signal "SCAN BCP" available over 37 and 38. The signal "SCAN BCP" is generated in the operator selection 13 which is shown in more detail in FIG. 11 and will be explained later hereinafter. For the time being, it is sufficient to say that the signal "SCAN BCP" will be a logic "1" whenever it is desired to shift the contents in shift register 12 in response to the shift signal on terminal 33. The output of gate 123 forms one input to gate 124, whose output is connected to one of the set and reset steering terminals of each of the flip-flops 120, 121, 122. The second input to gate 124 is the signal WSS CLEAR (word selector shift register clear) which is generated in the readin sequence control 162. Signal WSS CLEAR is a logic 0 whenever the word selection shift register is cleared and one of the flip-flops is set in response to one of the signals BUFFER IN, COMMAND IN or POSITION IN. This will be made clear in the explanation of FIG. 11. The signal WSS CLEAR is also connected to one input of gate 128 so that recirculation of data is blocked during the "clear" operation.

The scanning operation begins by setting flip-flop 120. This is done by virtue of the fact that the signal BUFFER IN forms one input to gate 125. When the signal BUFFER IN goes to logic 0, flip-flop 120 will be steered to set whenever the output of gate 124 is a logic 1. The 0 output of flip-flop 120 is connected to form one input to gate 126. The output of gate 126 forms one of the set steering input terminals to flip-flop 121 so that at the next shift pulse on terminal 33 flip-flop 121 will set. At the same time that flip-flop 121 sets flip-flop 120 will reset. Finally, the 0 output of flip-flop 121 forms one input to gate 127 whose output is connected to the set steering terminal of flip-flop 122 so that at the next shift pulse on input terminal 33 flip-flop 122 will set and flip-flop 121 will reset.

The outputs of the flip-flops 120, 121, 122 are fed to the readout selector 14 as indicated symbolically by the reference to output terminal 40.

In the operation detailed above, the flip-flop 120 was initially set. It is possible, however, to set any of the flip-flops. Hence, if it is desired to set flip-flop 121 rather than flip-flop 120 it is only necessary that both the signal COMMAND IN and the signal WSS CLEAR be at logic 0 simultaneously. Similarly, making the signal POSITION IN a logic 0 at the same time that WSS CLEAR is at logic 0 will cause flip-flop 122 to set. The signals BUFFER IN, COMMAND IN, and POSITION IN all originate in the operator selection 13 as indicated by their symbolic connection to input terminal 38.

Figure 10:
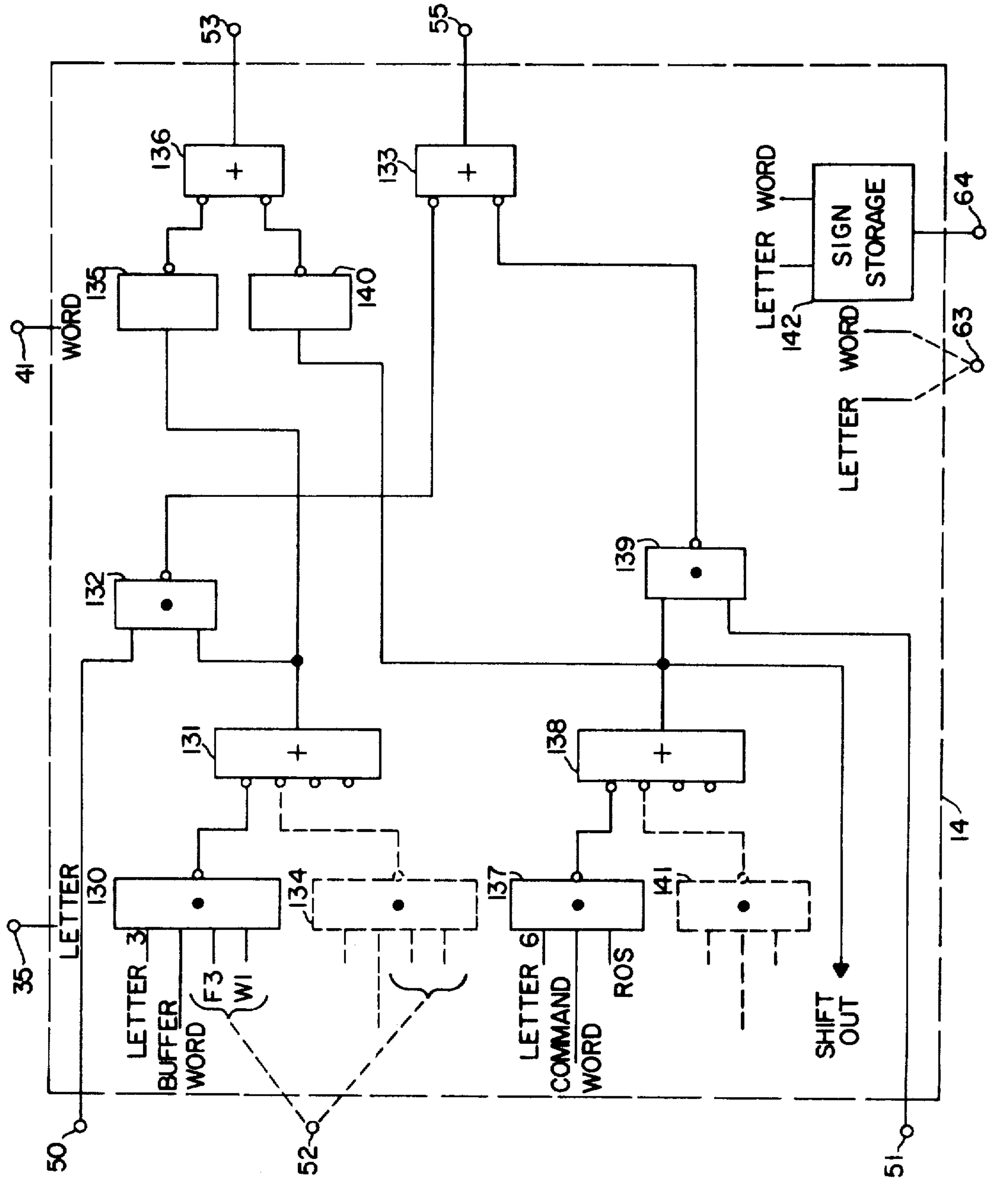
FIG. 10 is the detailed logic diagram of the readout data selector shown in FIG. 1.

Turning now to FIG. 10, there is shown a detailed logic diagram of the readout selector 14. As was noted above, the purpose of the readout selector 14 is to select the appropriate data from the data sources and relay this data at the appropriate time into the readout shift register 16. Since the method of selecting the various letters and associated words is the same, it will be necessary to explain this operation for only one specific letter and associated word.

Suppose, for example, that letter 3 is the letter "X" and that it is desired to display the buffer word. Suppose further, that the buffer word for the letter X is placed in the $F3W1$ position on the recirculating delay line 1. This selection is accomplished by way of gate 130 which has as its inputs the signal "LETTER 3", "BUFFER WORD", $F3$ and $W1$. The output of gate 130 will then go to a logic 0 at the time when the data pertaining to the buffer word for letter X is presented at the output of the write amplifier 3 which is connected to input terminal 50 of the readout data selector 14. The output of gate 130 forms one input to gate 131. When the output of gate 130 goes to a logic 0, the output of gate 131 goes to a logic 1. This enables gate 132 since the output of gate 131 forms one input to gate 132. The other input to gate 132 is the output of the write amplifier 3. Hence, the output of gate 132 is the desired data. The output of gate 132 forms one input to gate 133 whose output is connected to output terminal 55 which, as was pointed out above, is utilized to relay the selected data into the readout shift register 16.

The selection of data for other letters and their associated words is accomplished in precisely the same fashion as that outlined above for selecting the buffer word of letter X. This is indicated symbolically by the gate 134 similar to gate 130 whose inputs will be connected to the appropriate signals for selecting the desired letters. It is obvious that there will be a plurality of gates like 134 in order to select all these various combinations of letters and words.

As was pointed out above, it is also necessary to generate a signal in the readout data selector 14 indicative of the fact that data is being presented at the output of readout data selector 14. This is accomplished by virtue of the fact that the output of gate 131 is also connected to form the input to inverter 135. The output of inverter 135 forms one of the inputs to gate 136 whose output is connected to output terminal 53. By way of this connection, it can be seen that output terminal 53 will be a logic "1" any time there is selected data at output 55 of the readout data selector 14.

As was pointed out in the description of the block diagram of FIG. 1, the readout system of the present invention also has the capability of selecting data which may be stored in auxiliary storage locations. Suppose, for example, that letter 6 is the letter S and further suppose that the command word associated with the letter S is stored in auxiliary storage location 15. This data is selected by gate 137 which has as its inputs the signals "LETTER 6", "COMMAND WORD", and the signal "ROS". The signal "ROS" is generated in the cycle control 20 and is indicative of the fact that flip-flop 100, the readout start flip-flop has been set. When all three inputs to gate 137 go to logic 1, its output will go to logic 0. The output of gate 137 forms one input to gate 138. Hence, when the data from the auxiliary storage location 15 is desired, the output of gate 137 will be a logic 1 after the readout start flip-flop in cycle control 20 sets. At this time, the output of gate 138 will go to a logic 1. The output of gate 138 forms one input to gate 139. The other input to gate 139 is connected to input terminal 51 which, as was pointed out in the description of FIG. 1, is connected to auxiliary storage location. Accordingly, at this time the data from the auxiliary storage location will be available at the input terminal 51 and will be gated by a gate 139 to form the second input to gate 133 whose output is connected to the output terminal 55. In addition, as was pointed out above, it is necessary to provide a signal indicative of the fact that data is present at the output of the readout data selector 14. This is accomplished by virtue of the fact that the output of gate 138 is also connected to form the input to inverter 140 whose output is connected to form one input to gate 136. Accordingly, whenever the data is present at output terminal 55, the signal at output terminal 53 will be a logic 1, regardless of the source of data.

As was discussed in the explanation of the block diagram of FIG. 1, the auxiliary storage location may comprise, for example, a shift register which holds the data in a noninterlaced fashion. If this is the case, it is necessary to shift the data out of this storage location. This is accomplished by virtue of the fact that the signal out of gate 138, noted as "SHIFT OUT" may be relayed to initiate shifting of the data from the auxiliary storage location 15.

Finally, it was noted that output 63 of the readout data selector 14 is used to indicate the letter and word being displayed for the display device 18. This is accomplished by connecting the letter and word presently being displayed to the display device as shown symbolically by the connection of these two signals to output terminal 63. Finally, it was also noted that the readout data selector 14 has the function of indicating to the display device the sign of the data being displayed, where applicable. While there are many ways of storing the sign of circulating data, it is pointed out that this storage is not normally done as a part of the recirculating storage system but rather is stored in some auxiliary location denoted as the SIGN STORAGE 142. The appropriate sign is selected from the sign storage location 142 by virtue of the fact that the letter and word signals form an input to sign storage 142. The output of sign storage 142 is connected to output terminal 64 for illuminating the appropriate sign in the display device 18.

Figure 11:
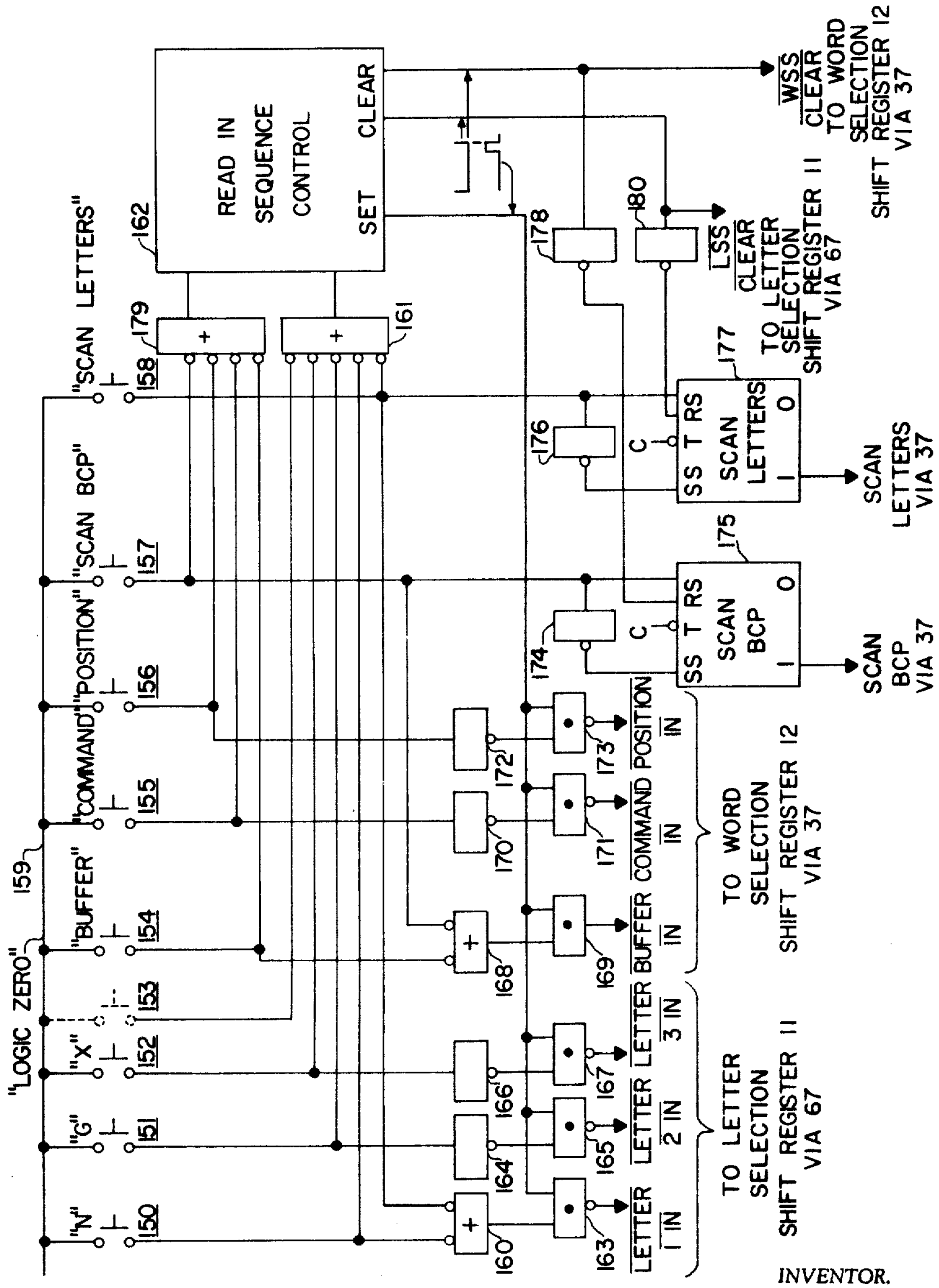
FIG. 11 is the detailed logic diagram of the operator selection shown in FIG. 1.

Turning now to FIG. 11, there is shown the detailed logic diagram of the operator selection 13. As was pointed out in the description of the block diagram of FIG. 1, operator selection 13 may comprise, for example, a series of manually operated selectors whereby the person operating the system may select the type of data desired to be displayed. It should be pointed out, however, that the present invention is not limited to display which is initiated by manually operable devices, but rather could also be carried out by any manner of data display selection such as a programmed cycle, etc.

Returning now to FIG. 11, there is shown a series of pushbuttons 150–158 which are representative of the operator selection devices. These pushbuttons may be used to initiate any of the types of display which the system of the subject invention comprehends.

In the first type of operation, the person operating the system may select the display of a particular letter and its associated word. Selection of the letter is accomplished by initiating one of the pushbuttons which is associated with the letters in the system. Hence, if it is desired to display the letter N, the operator will depress pushbutton 150. Pushbutton 150 is shown symbolically connected to a "LOGIC 0" bus 159. The pushbutton 150 forms one input to gate 160 so that when pushbutton 150 is depressed, the output of gate 160 will go to a logic 1.

The output of pushbutton 150 is also connected to form one of the inputs to gate 161. The output of gate 161 is connected to a readin sequence control 162 which generates the necessary signals to clear any previously selected letters as well as accomplish the selection of the desired letter. When readin sequence control 162 is activated by the output of gate 161, it generates two signals, one of which is denoted $\overline{\text{LSS CLEAR}}$ (letter selection shift register clear) and the other of which is denoted the "SET" signal. The $\overline{\text{LSS CLEAR}}$ signal is relayed over 67, 68 to clear the letter selection shift register 11 and is shown symbolically in FIG. 11 as going to a logic "0" for a sufficient time to clear all the flip-flops in this shift register. The specific time at which the signal $\overline{\text{LSS CLEAR}}$ goes to logic 0 will depend upon the particular application since this signal need remain at a logic 0 only long enough to insure that all the flip-flops in the shift register are cleared. At the end of the CLEAR signal, the signal SET goes to a logic 1. This is shown symbolically at the "SET" output of the readin sequence control 162. The set signal is at logic 1 for one bit time which coincides with the last bit time that the clear signal is at logic 0. The signal "SET" is connected to form one of the inputs to gate 163. The other input to gate 163 is the output of gate 160. Since both inputs to gate 163 will be a logic 1 at this time, the output will go to logic 0 thereby generating the signal $\overline{\text{LETTER 1 IN}}$. The signal $\overline{\text{LETTER 1 IN}}$ is fed over 67, 68 to the letter selection shift register 11 as was pointed out in the description of shift register 11 above. Selection of other letters is accomplished in a similar fashion by the operation of pushbuttons 151, 152, 153. 153 is shown in dotted form to represent all of the remaining "letters" which may be selected. If the letter G is desired, pushbutton 151 is depressed. The output of pushbutton 151 is fed to inverter 164 whose output forms one of the inputs to gate 165. Accordingly, after the operation of the readin sequence control 162, the output of gate 165 which is the signal $\overline{\text{LETTER 2 IN}}$ will go to logic 0. Similarly, the operation of pushbutton 152 will by virtue of its connection to inverter 166 which is connected to gate 167 appropriately generate the signal $\overline{\text{LETTER 3 IN}}$.

Selection of the desired word is accomplished by virtue of the operation of pushbuttons 154, 155, 156. If for example it is desired to select the buffer word, pushbutton 154 will be depressed. Pushbutton 154 forms one of the inputs to gate 168 whose output is connected to one input of gate 169. Pushbutton 154 also forms one of the inputs to gate 179 whose output is connected to readin sequence control 162. Upon receipt of a signal from gate 179, readin sequence control 162 generates two signals, one of which is denoted $\overline{\text{WSS CLEAR}}$ (word selection shift register clear) and the other of which is denoted the "SET" signal. Signal $\overline{\text{WSS CLEAR}}$ is relayed over 37, 38 to clear the word selection shift register 12 in a manner similar to that described for $\overline{\text{LSS CLEAR}}$ to clear the letter selection shift register. It will be noted that the "SET" signal is generated when the readin sequence control is activated by either the output of gate 161 or the output of gate 179. After the appropriate operation of the readin sequence control 162, the output of gate 169 will go to a logic 0 thereby generating the signal $\overline{\text{BUFFER IN}}$. The signal $\overline{\text{BUFFER IN}}$ is relayed over 37, 38 to the word selection shift register 12 in order to select the desired word as was pointed out in the description of FIG. 9. Similarly, the selection of the command word is accomplished by depressing pushbutton 155. Pushbutton 155, operating in conjunction with inverter 170 and gate 171 acts to generate the signal $\overline{\text{COMMAND IN}}$ and similarly, the operation of pushbutton 156 in conjunction with inverter 172 and gate 173 operates to generate the signal $\overline{\text{POSITION IN}}$.

In addition to the ability to select the particular letter and word desired, it is, as was pointed out above, possible to select a particular predetermined sequence. This predetermined sequence may be, for example, the continuous repetitive display of all three words associated with a particular letter. This type of operation is initiated by operation of pushbutton 157. Pushbutton 157 initiates the operation of the readin sequence control 162. In addition, it is noted that the output of pushbutton 157 forms the input to inverter 174. The output of inverter 174 is connected to the set steering terminal of the "SCAN BCP" flip-flop 175. Accordingly, initiating pushbutton 157 will cause the flip-flop 175 to set, thereby selecting the sequencing of the three words associated with the particular letter selected. This is accomplished by virtue of the fact that the signal "SCAN BCP" is fed to the word selection shift register 12 and causes it to sequence each time a pulse is fed into it from the pulse width control 8. Finally, in addition to setting the flip-flop 175 it is noted that the pushbutton 157 also forms the second input to gate 168. Accordingly, closing pushbutton 157 will also generate the signal $\overline{\text{BUFFER IN}}$.

The final type of operation desired is the ability to scan a particular word associated with all letters. This is accomplished by first operating the pushbutton 158. Initiation of pushbutton 158 causes the operation of readin sequence control 162 and, in addition, causes flip-flop 177 to set by virtue of the fact that the output of pushbutton 158 is connected through inverter 176 to the set steering terminal of flip-flop 177. The output of flip-flop 177 causes the letter selection shift register 11 to sequence through all the desired letters as was pointed out in the description of the letter selection shift register 11.

While the foregoing have been descriptions of particular embodiments illustrating the invention, the appended claims are intended to cover all forms which fall within the scope of the invention.

There may be sequences in which all letters and associated data would not be displayed. For example, if the "position" word were selected and a "SCAN LETTERS" selection were also selected, only designated letters associated with position data would be included in the sequence. This is accomplished by the interaction of operator selection 13, pulse width control 8 and the letter selection shift register 11. As noted in the description of the letter selection shift register, there are outputs from 11 connected to 13. These are represented by the connection at terminal 66. For a designated sequence of letters, logic signals appearing on these connections will be used in conjunction with the operator selections such as those of this example to control via terminal 39 the resetting of flip-flop 110 and the pulse width control 8. In this manner, the width of the pulse at terminal 31 is controlled to allow the required number of clock times for the letter selection shift register to shift to the next selection on each application of n input at terminal 30. Both types of operation, namely scanning the words with a particular letter and scanning the letter associated with a particular word, may be combined to obtain the following additional operation. First, all letters and associated data related to the first word are sequentially displayed, followed by a sequential display of all letters and associated data related to the second word, and continuing in this fashion through the remaining words.

What is claimed as new and desired to be secured by Letters Patent of the United States is:

1. A readout system for the visual display of digital data stored in a recirculating register wherein the data is grouped by functions with each function group having a plurality of multidigit words, and wherein the words in each function group are interlaced by presenting the least significant digit of each of the words in coded group form, followed by the next-to-the-least significant digit of each of the words in the coded group form and continuing in this fashion until all of the words are interlaced, said readout system comprising:

a. selection means further comprising:
   i. means, coupled to said circulating register and timed with respect to the recirculation of digital data stored therein, for selecting words to be displayed,
   ii. means for selecting a sequence in which words selected by said word selecting means are to be displayed,
   iii. means for selecting a rate at which words are to be displayed in the sequence selected by said sequence selecting means, said rate selecting means including a variable frequency oscillator for adjusting the rate at which the words are displayed in sequence;

b. storage means operatively connected to said word selection means for storing words selected by said word selecting means in a non-interlaced format wherein the digits of each word are grouped together; and c. display means operatively connected to said storage means for providing a visual display of the contents of said storage means.

2. The readout system as defined in claim 1 wherein said word selection means includes a recirculating shift register.

3. A readout system for the visual display of digital data stored in a recirculating register, wherein the data is grouped by functions with each function group having a plurality of multidigit words, and wherein the words in each function group are interlaced by presenting the least significant digit of each of the words in coded group form, followed by the next-to-the-least significant digit of each of the words in the coded group form and continuing in this fashion until all of the words are interlaced, said readout system comprising:

a. selection means, coupled to said recirculating register and timed with respect to the recirculation of digital data stored therein, for selecting for display either predetermined words occurring in a predetermined plurality of the function groups or each of the words in one of the function groups to the exclusion of other function groups;

b. control means operatively coupled to said selection means for determining whether said selection means selects for display the predetermined words in said predetermined plurality of function groups or the words in said one function group;

c. storage means operatively connected to said selection means for storing words selected by said selection means in a non-interlaced format wherein the digits of each word are grouped together; and d. display means operatively connected to said storage means for providing a visual display of the contents of said storage means.

4. An arrangement for utilizing digital data from a plurality of signal processing devices, including a circulatable register for storing digital data by recirculation through said register, wherein the digital data in at least one of the signal processing devices comprises a plurality of multidigit words interlaced by separately grouping the digits of corresponding digit significance for each of the words, comprising:

a. selection means further comprising:
   i. means, coupled to said recirculating register and timed with respect to the recirculation of digital data stored therein, for selecting words to be displayed,
   ii. means for selecting a sequence in which words selected by said word selecting means are to be displayed,
   iii. means for selecting a rate at which words are to be displayed in the sequence selected by said sequence selecting means;

b. storage means coupled to said word selection means for storing the digital data selected by said word selection means in non-interlaced format wherein the digits of each word are grouped together; and c. means coupled to said storage means for utilizing the digital data stored therein.

5. An arrangement as recited in claim 4 wherein the adjusting means in said rate selecting means comprises a variable frequency signal generator.

* * * * *

UNITED STATES PATENT OFFICE
CERTIFICATE OF CORRECTION

Patent No. 3,651,481 Dated March 21, 1972

Inventor(s) John T. Evans and Leroy U. C. Kelling

It is certified that error appears in the above-identified patent and that said Letters Patent are hereby corrected as shown below:

Column 6, line 67, "B1W1a02" should be -- B1W1D2 --; Column 7, line 35, "0.38" should be replaced with -- "0." --, line 74, "LETERS" should read -- LETTERS --; Column 8, line 44, "LETTER 6 in" should be -- LETTER 6 IN --; Column 14, lines 45, 46, 47, 48, entire paragraph should be placed as the paragraph after line 73.

Signed and sealed this 2nd day of January 1973.

(SEAL)
Attest:

EDWARD M. FLETCHER, JR.
Attesting Officer

ROBERT GOTTSCHALK
Commissioner of Patents